Oct. 22, 1929.  A. J. FAUSEK ET AL  1,732,401
TORCH
Filed Nov. 1, 1924
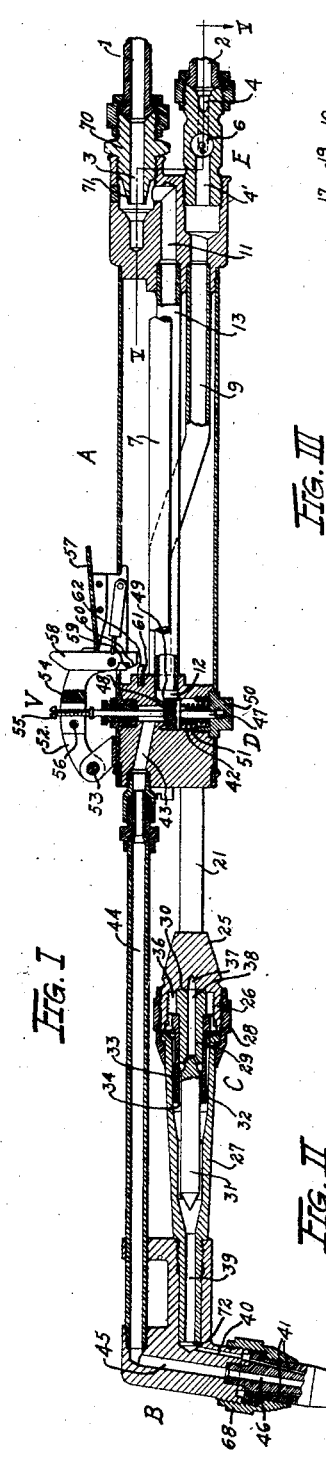
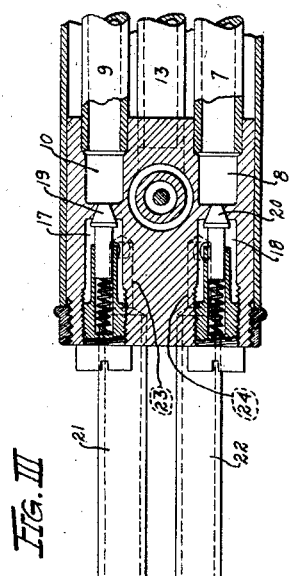
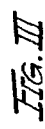
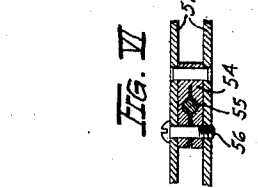
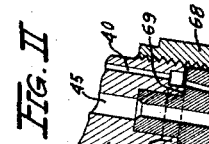
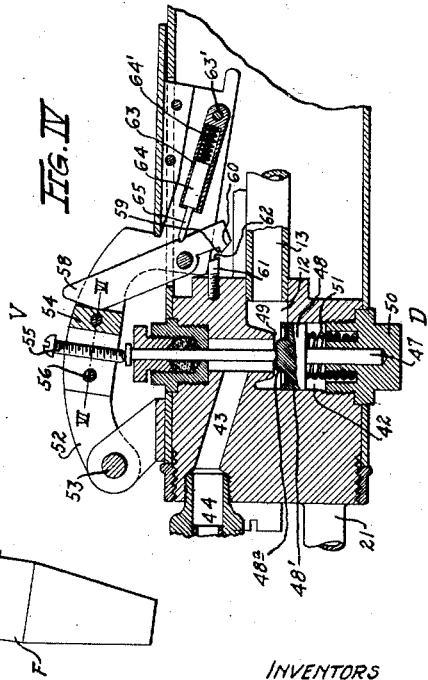
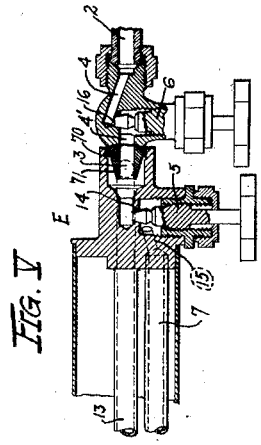
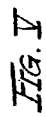
INVENTORS
A. J. FAUSEK
I. F. FAUSEK
By Cook & McCauley
ATTORNEYS Patented Oct. 22, 1929

1,732,401

UNITED STATES PATENT OFFICE

ARTHUR J. FAUSEK AND IRWING F. FAUSEK, OF ST. LOUIS, MISSOURI

TORCH

Application filed November 1, 1924. Serial No. 747,184.

This invention relates to a torch for use in cutting metals through the medium of an oxy-acetylene flame, the invention having for one of its objects the production of a simple and efficient mechanism for controlling the flow of auxiliary oxygen to the tip of the torch.

Another object of the invention is to provide means whereby very close contact may be obtained between the tip of the torch and the head to which said tip is secured.

Still another object of the invention is to provide a torch of the type described with means whereby a more regular flow of oxygen is obtained.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a longitudinal section of a torch made in accordance with our invention.

Fig. II is a fragmentary view, partly in elevation and partly in section, showing the tip of our torch, together with a portion of the head of said torch, said view illustrating the construction which permits of a very tight joint between the parts mentioned.

Fig. III is an enlarged longitudinal section of a fragment of our torch showing certain of the valves associated therewith.

Fig. IV is an enlarged fragmentary section illustrating the mechanism for controlling the flow of auxiliary oxygen to the tip of our torch.

Fig. V is a horizontal section of the rear portion of our torch showing the regulating valves thereof.

Fig. VI is a sectional detail of a portion of the auxiliary oxygen-controlling valve of our torch.

In the drawing, A designates our improved torch which includes a head B, a mixing chamber C, valve housing D and a tailpiece E. Associated with the tailpiece of our torch is an oxygen conductor 1 and an acetylene conductor 2 through which oxygen and acetylene pass from reservoirs to the torch. Arranged within the tailpiece E is a passageway 3, which is in communication with the passageway within the conductor 1, and a passageway 4, which is in communication with the passageway within the conductor 2. Associated with the passageway 3 is a valve 5 which is adapted to regulate the flow of fluid into the torch through said passageway, and associated with the passageway 4 is a valve 6 which is adapted to regulate the flow of fluid into the torch through said passageway 4.

7 designates a tube which is in communication with and connects the passageway 3 in the tailpiece E with a passageway 8 in the valve housing D. 9 designates a tube which is in communication with and connects the passageway 4 in the tailpiece E with a passageway 10 in the valve housing D. Located within the tailpiece E is an auxiliary passageway 11 which is in communication with a passageway 3, as shown clearly in Fig. I, and arranged in communication with said passageway 11 and with a passageway 12 in the valve housing D is a tube 13.

By referring to Figs. I and V, it will be noted that the passageway 12, tube 13 and passageway 11 are always in free communication with the passageway 3 whereby oxygen from the conductor 1 may pass through the passageways and tube mentioned. However, it will be noted from Fig. V that for oxygen to pass into and through the tube 7 said oxygen must first pass through the valve opening 14, and this is of course impossible when the valve 5 is in a closed position, as shown in Fig. V. If it be assumed, however, that valve 5 is in an open position, it is quite plain that oxygen might pass through the opening 14 into the valve chamber and from there through the passageway 15 into and through the tube 7.

Referring now to the passageways through which acetylene passes, it will be noted that the passageway 4 is separated from the passageway 4' by a valve 6 so that when the valve 6 is in a closed position, as shown in Fig. V, no acetylene may pass into said passageway 4'. However, when the valve 6 is in an open position acetylene may pass through the valve opening 16 into and through the passageway 4' and through the tube 9 to the valve housing D.

Arranged within the valve housing D is a valve chamber 17 which is in communication with the tube 9, and arranged adjacent to said valve chamber 17 is a valve chamber 18 which is in communication with the tube 7. Located within the valve chamber 17 is a check valve 19, and located within the valve chamber 18 is a check valve 20. The valve chambers 17 and 18 are in communication with tubes 21 and 22 through the medium of passageways 23 and 24, so that fluid passing forwardly in the torch may unseat the check valves 19 and 20 and pass through the valve chambers 17 and 18 to the tubes 21 and 22.

The tubes 21 and 22 communicate with the interior of the mixing chamber C, as shown clearly in Fig. III, and said mixing chamber comprises a head 25 provided with an annular wall 26 having external and internal screw threads. Associated with the head 25 is a shell 27, said shell being coupled to the head 25 by means of a coupling 28. Located within the mixing chamber is an inner member 29, the rearmost end of which is located in a depressed seat 30 in the head 25, and said inner member is provided with a stem 31, which extends forwardly in the mixing chamber. Arranged to surround a portion of the inner member 29 is a sleeve 32 which is of such diameter that an annular space 33 is provided between the outer face of said sleeve and the inner face of the wall of the shell 27, and a second annular space 34 is provided between the inner face of said sleeve and the outer face of the stem 31.

By referring to Fig. III it will be noted that the housing C is provided with a passageway 35 which provides a means of communication between the tube 21 and the space 36, which in turn communicates with the annular space 33. It will also be noted that the housing C is provided with a passageway 37 communicating with the passageway 38, which in turn communicates with the annular space 34. From this it is plain that acetylene passing through the tube 21 will pass through and be discharged from the annular space 33, while oxygen passing through the tube 22 will pass through and be discharged from the annular space 34. Immediately upon being discharged from the annular spaces 33 and 34 the oxygen and acetylene will be completely commingled within the shell 27, after which said mixture of oxygen and acetylene will pass through the passageway 39, passageway 40 and passageways 41 to the discharge end of the tip F, where said mixture is burned.

Located within the valve housing D is a vertical opening 42, which is in comunication with the passageway 12, and arranged at the opposite side of said valve housing is a passageway 43 communicating with said vertical opening 42. 44 designates an auxiliary oxygen tube which communicates with the passageway 43, said tube also communicating with a passageway 45 in the head B of the torch, which passageway 45 in turn communicates with a passageway 46 formed centrally through the tip F.

As already stated, the auxiliary oxygen tube 13 is always in free communication with the oxygen reservoir, and to provide means whereby the flow of auxiliary oxygen to the tip may be controlled we employ a controlling valve V, which will now be described. 47 designates a vertically arranged valve stem which is provided with a head 48 adapted to be moved into engagement with a valve seat 49 to interrupt the flow of oxygen from the passageway 12 through the vertical opening in the valve housing D and through the passageway 43. Located below the valve head 48 is a plug 50 provided with a central opening into which the lower end of the valve stem 47 extends, and arranged between said plug and said valve head is a coil spring 51.

Arranged above the valve housing is a valve-operating lever 52 which is pivoted at 53 to a bracket supported by the valve housing D. The pivoted lever 52 is provided with a split block 54 having an internally threaded vertical opening formed in the oppositely disposed legs of said split block. Arranged in the vertical threaded opening in the split block is a threaded member 55, the lower end of which is in contact with the upper end of the valve stem 47, as shown clearly in Figs. I and IV. 56 designates a screw which passes through the lever 52 and through the legs of the split block 54, whereby said legs of said split block may be drawn together to clamp the vertical threaded member 55 in a fixed position. It is apparent from the foregoing that the threaded member 55 may be adjusted vertically by unscrewing the clamping screw 56, whereupon said threaded member may be rotated to move same vertically. After the threaded member has been properly positioned the clamping screw may be again tightened to clamp said threaded member in a fixed position.

It is apparent from the foregoing that if it is desired to open the valve V to permit oxygen to flow from the tube 13 to the tube 44 it is only necessary for the operator to depress the flat portion 57 of the lever 52, thereby moving the valve stem 47 downwardly and unseating the valve 48.

58 designates a trigger which is pivotally mounted on the lever 52, said trigger being provided with a shoulder 59 adjacent to its lower end and having an inclined face 60 in close proximity to said shoulder. Secured to the valve housing D below the lever 52 is a pin 61 provided with an inclined face 62. The trigger 58 is so located with respect to the pin 61 that when the lever 52 is moved downwardly the inclined faces on said pin and said trigger will move the lower portion of said trigger rearwardly to permit the shoulder 59 on said trigger to move beneath the pin 61 and hold said lever in a lowered position until said shoulder is released by moving the upper portion of the trigger forwardly. 63 designates a tubular housing within which is located a plunger 64 provided with a stem 65 which extends through an opening in an end of said tubular housing. Located within the housing 63 behind the plunger 64 is a coil spring 64' which tends to force said plunger toward the trigger 58. The tubular housing 63 is pivoted to the lever 52 at the point indicated by the reference character 63', and the trigger 58 is provided with a notch into which the pointed end of the stem 65 of the plunger extends. As will be seen by referring to Fig. I, the axis of the plunger 64 and stem 65 is in alinement with the pivotal point of the tubular housing 63 and the pivotal point of the trigger 58, consequently the pressure exerted by the coil spring 64' will not prevent slight movement of the trigger above its pivot when the parts are positioned as described. In view of the foregoing each time the lever 52 is depressed the shoulder 59 will move below the pin 61 and lock said lever in its lowered position. It sometimes happens that it is not desirable to lock the lever 52 in a lowered position so that the valve will remain open, and when this is so the operator will move the upper end of the trigger 58 forwardly to the position in which it is shown in Fig. IV. This will have the effect of moving the axis of the plunger 64 and stem 65 off of dead center with relation to the pivotal point of the trigger 58, whereby the pressure exerted by the coil spring 64' will exert an upward pressure against said trigger and will retain it in the position in which it is shown in Fig. IV, in which position the shoulder 59 will not engage the pin 61.

An important feature of our invention resides in the manner in which a fluid-tight joint is obtained between the head B and the tip F of the torch. By referring to Fig. II it will be noted that the head B is provided with an inner annular wall 66 and an outer annular wall 67. It will be noted also that the inner annular wall 66 is slightly longer than the outer annular wall 67. When the tip F is arranged in place relative to the head B and the coupling member 68 is manipulated, it is quite plain that very tight contact will be made between the face 69 of the tip F and the bottom face of the inner annular wall 66 before contact is made between the outer annular wall 67 and said face 69 of the tip, and as a consequence of this a very tight joint is obtained.

By referring to Figs. I and V, it will be noted that the oxygen passageway 3 is formed in a member 70 which is provided with a nozzle 71 at its forward end. It will be also be noted that this nozzle 71 extends beyond the point where the auxiliary oxygen passageway 11 enters the space within which said nozzle 71 is located, and that said nozzle is pointed directly toward the valve opening 14 through which oxygen passes to the mixing chamber of the torch. By this arrangement it is plain that when the valve V is operated to permit oxygen to pass through the tube 44 there will be no great drop in pressure at the valve opening 14, as there would be if the parts were not so arranged, for the reason that the nozzle 71 is directing oxygen directly toward said opening 14, consequently the pressure at the valve opening 14 would always be approximately constant in spite of the fact that a relatively large body of oxygen is passing through the passageway 11.

It will be noted from Fig. I that the head B is provided with an opening 72 into which the forward end of the shell 27 extends. It will also be noted that the passageway 40 is drilled into the end of said opening 72. This arrangement renders it easy to form the passageway 40, for the reason that it is not necessary to drill into a passageway of equal size, as has been the case in the past. By having the large opening 72 the passageway 40 need not be as accurately drilled as if said opening 72 were smaller.

It will be noted that the head 48 of the valve V is provided with a seat 48' formed of rubber or similar material. It will also be seen that the valve head 48 is provided with an upwardly extending portion 48ª which extends upwardly into the vertical opening within which the valve stem is located. By this arrangement the valve seat 48' is protected from the high pressure fluid as it passes from the space 12 into the vertical valve opening, for it is plain that the greatest friction will take place as the fluid is passing between the restricted space between the lower edge of the vertical valve opening and the annular peripheral face of the portion 48ª of the head. This will cause the wear resulting from the passage of the high pressure fluid to be on these metal parts and not on the seat 48' as it would if the only opening were immediately adjacent to the seat 48' and the fluid were directed against said seat.

We claim:

1. A valve adapted for association with an oxy-acetylene or like torch for controlling the flow of gas through the gas conductors leading to the tip of such torch, including pivoted means whereby said valve may be operated, a pivoted member arranged to engage a fixed element whereby said pivoted means may be locked in a fixed position, and means movable to a position where it engages said pivoted member at a point between its pivot point and the end thereof opposite to the end which engages said fixed member to exert pressure against said pivoted member in offset relation with respect to the pivotal point thereof, whereby said pivoted member may be rendered inoperative.

2. In a valve adapted for association with an oxy-acetylene or like torch for controlling the flow of gas through the gas conductors leading to the tip of said torch including pivoted means whereby said valve may be operated, a pivoted member arranged to engage a fixed element whereby said pivoted means may be locked in a fixed position, and spring-actuated means pivoted independently of said pivoted member and movable to a position where it engages said pivoted member at a point between its pivot point and the end thereof opposite to the end which engages said fixed member to exert pressure against said pivoted member in offset relation with respect to the pivotal point thereof, whereby said pivoted member may be rendered inoperative.

3. A valve for a cutting torch for controlling the flow of gas through the gas conductor leading to the tip of said torch, including pivoted means whereby said valve may be operated, a pivoted member arranged to engage a fixed element whereby said pivoted means may be locked in a fixed position, and a spring actuated plunger pivotally supported by said pivoted means and movable to a position where it exerts pressure against said pivoted member in offset relation with respect to the pivotal point thereof, whereby said pivoted member is rendered inoperative.

4. A torch comprising a mixing chamber, a tip, an oxygen conductor leading to said mixing chamber, an auxiliary oxygen conductor leading to said tip, a tail-piece having an opening formed therein which is closed at one end thereof by an inperforate wall and with which opening said oxygen conductor and said auxiliary oxygen conductor communicate, a discharge member extended into said opening in said tail-piece, said discharge member being extended beyond the point at which said auxiliary oxygen conductor communicates with said opening in said tail-piece, and said discharge member being arranged so that fluid discharged therefrom will be directed toward the imperforate wall closing one end of the opening in which same is arranged and in the direction of location of the point at which said oxygen conductor communicates with said opening.

In testimony that we claim the foregoing we hereunto affix our signature.

ARTHUR J. FAUSEK.
IRWING F. FAUSEK.